Dec. 22, 1953  O. J. OLSON  2,663,454
OUTLET BOX WITH OVERLAPPED KNOCKOUT
Filed Jan. 30, 1950  2 Sheets-Sheet 1
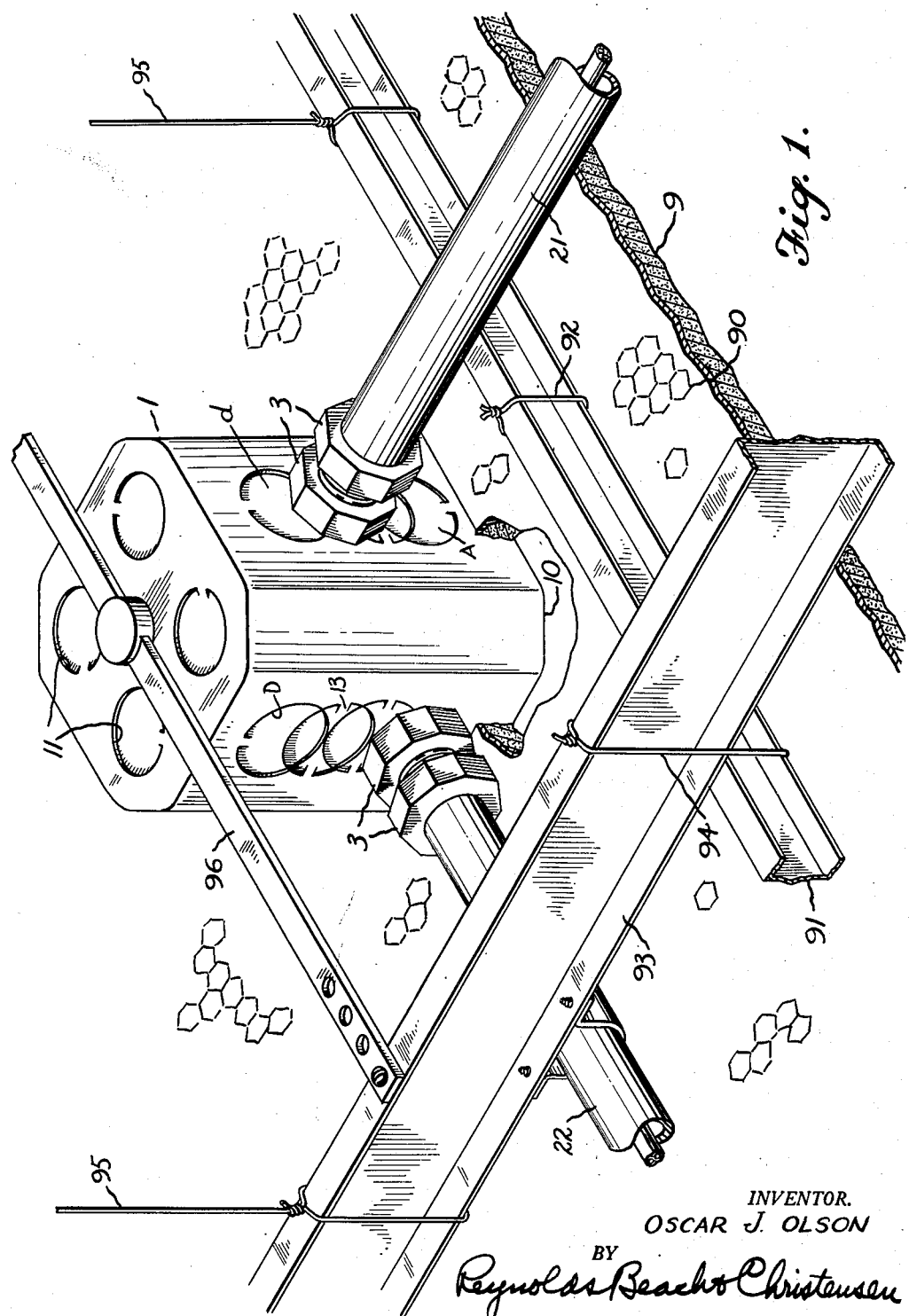
INVENTOR.
OSCAR J. OLSON
BY
Reynolds, Beach & Christensen
ATTORNEYS Dec. 22, 1953    O. J. OLSON    2,663,454
OUTLET BOX WITH OVERLAPPED KNOCKOUT
Filed Jan. 30, 1950    2 Sheets-Sheet 2

INVENTOR.
OSCAR J. OLSON
BY
Reynolds Beach & Christensen
ATTORNEYS

Patented Dec. 22, 1953

2,663,454

UNITED STATES PATENT OFFICE 2,663,454

OUTLET BOX WITH OVERLAPPED KNOCKOUTS

Oscar J. Olson, Seattle, Wash.

Application January 30, 1950, Serial No. 141,241

9 Claims. (Cl. 220—27)

Outlet boxes for connection to lighting fixtures, or for the support of switches, sockets, or like electrical elements, are liberally used in modern construction, and are normally set flush with the surface of the finished wall. Behind this wall are various structural elements, pipes, conduits, and the like, installed at different times, often by different workmen, which in the aggregate produce a maze of interlacing members each vying with the other for space behind the finish wall. Some lie close behind the wall, whereas others are thereby forced to a greater depth behind the wall. The result is that a conduit for electrical leads which must be connected to a given outlet box, must often be bent sharply and with some little accuracy, in a small space, and in order to get over or around some already installed member, and to lead its end to the proper spot in the wall of the outlet box where the knockout is located, for such outlet boxes are normally provided with side wall knockouts located at one depth only, inwardly from its open outer end, and the conduit must be connected there, or else must be gooseneked and connected through a knockout in the enclosed end wall of the outlet box, or the outlet box must be increased in depth by the addition of an extension, which latter is costly, and either of which adds to the depth necessary behind the finish wall, which sometimes is a critical dimension.

It is the object of the present invention to provide an outlet box so designed that conduits may be led to and from its side walls by whatever is the most direct path, having regard to the avoidance of structural elements and the like creating obstructions, so that the bending or offsetting of the conduits, particularly within close quarters, is avoided to the highest possible degree, the ease of connection of the conduits to the outlet box is greatly improved, the possibility of dislocation of the outlet box is lessened, and the need for greater depth purely for purposes of connecting conduits to the outlet boxes is eliminated.

Likewise it is an object of the present invention to provide an outlet box and a wall assembly including the same, of a design having the maximum in simplicity, and at no appreciable cost in addition to normal outlet boxes and assemblies incorporating the same, and indeed at less cost than the normal assembly if an extension box has to be employed.

These and other objects of the present invention will become more clearly apparent as this specification progresses.

The features which distinguish the present invention are shown in a typical form and arrangement in the accompanying drawings, and will be more fully disclosed in this specification and in the claims which terminate the same.

In the accompanying drawings the invention is shown, as has been indicated, in a single typical form, but it will be realized that the principles of the invention may be incorporated in various other forms and arrangements, and that in particular the outlet box illustrated is a generally standard octagonal box, but that there are a number of other standard forms, any of which may incorporate the principles of the present invention, as will shortly be made clear.

Figure 1 is an isometric view from above, or more generally speaking from the rear of a finish wall or a ceiling of the suspended type, showing my improved outlet box, assembled in operative relationship to such finish wall and to the structural elements supporting the same.

Figure 4:
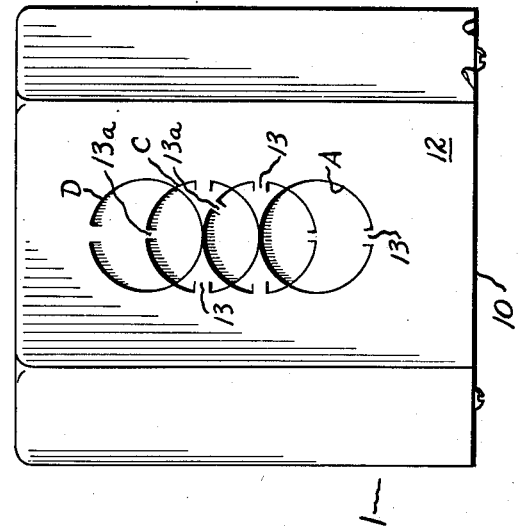
Figure 4 is a side elevational view similar to Figure 2, showing a slightly modified arrangement.
Figure 3:
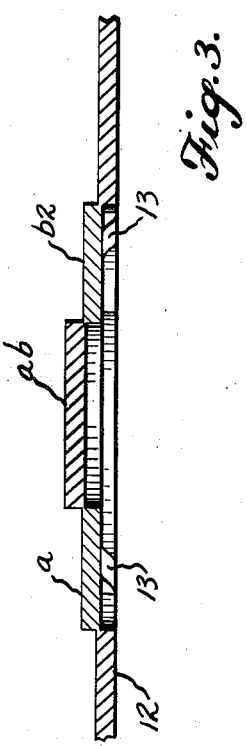
Figure 3 is an enlarged sectional view through a wall of the same generally at the line 3—3 of Figure 2.

As has been indicated above, the invention in Figure 1 is shown in assembled relationship above or to the rear of a ceiling 9, which is a finish wall of one type, and which is directly supported upon expanded metal lath 90. The lath is wired to or otherwise supported from structural elements such as the channel 91, as is indicated at 92, there being a number of such channels 91 at fairly close spacing in direct contact with the rear side of the metal lath 90. In turn these channels 91 are crossed by and connected to heavier channels 93, by wire ties as indicated at 94, hence the channels 93 are spaced from the rear side of the metal lath 90 by the depth of the channels 91. The channels 93 themselves being of greater depth than the channels 91 obstruct quite materially the space behind the wall 9. The elements 93 in a vertical or side wall might be the studs or might be carried by studs, or secured to furring strips. In a ceiling the entire assembly is usually suspended from above by the wires 95.

The outlet box 1, with exceptions that will be pointed out hereinafter, is or may be of any standard shape or size. The one chosen for illustration is a standard octagonal box of some appreciable depth, sufficient that its outer edge 10 may lie flush with the inside or forward face of the finish wall 9, as is customary, and extending to the rear of the finish wall, that is, behind the metal lath 90, to an appreciable depth. It is shown as provided with the conventional knockouts 11 in its closed end wall, and is supported by a strap 96 extending between structural elements such as the channel 93 and a similar channel spaced therefrom, or in any normal manner.

Thus supported and located, it is obvious that from one direction the channels 91 somewhat obstruct access to a particular location in the side wall of the outlet box 1, such as in earlier outlet boxes would be the location of the knockout, and from another direction the channels 93 also obstruct access to the box 1, but at a different depth or level. Both the conduits 21 and 22 intended for connection to the outlet box 1 would have to be bent or offset sharply if the knockouts in the side walls of the outlet box were at one location and one only, as is normally the case. Moreover if the problem of access of the conduit to the outlet box be complicated by water pipes, other electrical conduits, air ducts or the like, all of which are grouped in this specification under the general term "structural elements," it may be extremely difficult to connect the conduits properly to the outlet box, and yet the latter must be located at the designated spot, in accordance with the architect's plans.

According to the present invention, in at least one and preferably in each of the side walls 12 which are to have knockouts, a plurality of knockouts are provided and are arranged in overlapping relationship and at graduated depths. Each such knockout is normally—but not necessarily—substantially circular, and is so illustrated. Considering the several circles, the circle A intersects the circle B; the circle C intersects the circle B and preferably is tangent to the circle A at the center of the circle B; and if a fourth or additional circle such as D is employed, the circle D intersects the circle C, and is tangent to the circle B at the center of the circle C. The result is a straight alignment of the several knockouts formed by these circles, one being located near the open end 10 of the outlet box and the last being located nearer its closed end.

While a straight line arrangement is preferred the invention is not to be construed as limited thereto, for any other convenient relative overlapping arrangement which accomplishes the end in view is within the present invention.

Figure 2:
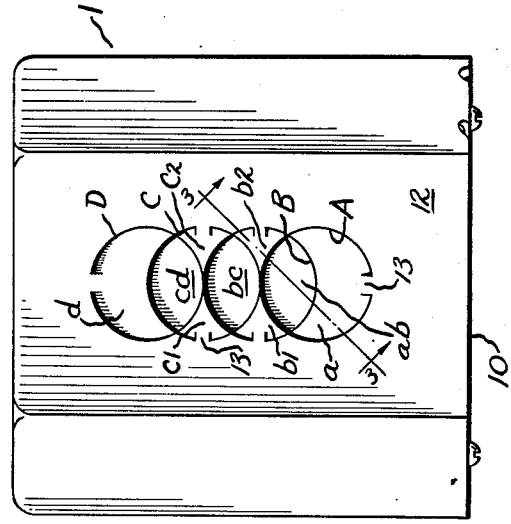
Figure 2 is a side elevation of such an outlet box in a presently preferred form of arrangement such as incorporates the present invention.

The manner of forming these knockouts is not important in itself. Normally they will be formed as knockouts have heretofore been formed, namely by punching in or offsetting the plane of the metal within the several circles to fracture the metal substantially entirely about the circle, but leaving ordinarily a retaining tongue 13 to supplement the marginal retention in supporting each such knockout. However in the overlapped pattern, shown for example in Figure 2, a part-circular portion $a$ of the area within the circle A is comarginal with the sidewall 12, as is the case with each of the other circles, as at $b1$, $b2$, $c1$, $c2$, etc., whereas the lenticular portions $ab$, $bc$, $cd$, of the area within each such circle which is common to another circle, are not comarginal with the sidewall 12 itself, but are independent thereof, and may be formed by further offsetting this area $ab$, $cd$, etc., which is common to two intersecting circles. It is preferred that each of the comarginal areas $a$, $b1$, $b2$, $d$, etc. be retained by the tongues 13 but that the retention of the further offset lenticular areas $ab$, $bc$, $cd$ common to two circles be merely by means of their marginal retention along the lines of fracture of the metal that defines these areas. At the same time, as in Figure 4, it is within the scope of the invention to provide additional tongues such as $13a$ whereby these common lenticular areas $ab$, $bc$, $cd$ are secured by the additional tongues to certain of the comarginal part-circular areas, as $a$, $c2$, $d$, to be supported thus from the latter.

Whenever in installing such an outlet box it is found that one of the conduits 21 would naturally come at a particular level in avoiding a structural element such as the channel 91, the knockout most nearly in line with the conduit would be knocked out in the normal way, and all others would remain in place, and in consequence the conduit 21 could be connected to the box with little or no offsetting or bending of the conduit. Likewise the conduit 22, in running under or outwardly of the channel 93, would naturally reach the outlet box at a somewhat different level, and here again the knockout most nearly in line with the conduit 22 would be knocked out in the normal way. In each case the coupling element 3 would connect up the end of the conduit and the outlet box and substantially no deformation of the conduit for the purpose of connection would be required. In other words, the point of connection of the conduit is independent of one particular or arbitrary location of a knockout.

The present invention is to be distinguished from those known arrangements wherein knockouts are provided in multiple, one wholly within another and concentrically or eccentrically arranged, primarily for the purpose of connecting up conduits of varying sizes. The present invention is not concerned with the size of the conduit, and normally, but not necessarily a box would be arranged for connection of only one size to any given side wall, or at least the knockouts in any given side wall would be of one size only, sufficiently large to take the largest conduit, and then perhaps a reducer would be required externally of the knockout box, if a smaller conduit is to be connected. The present invention is concerned with the connection of the conduit with no particular or arbitrarily located point in the wall of the outlet box, but rather at any depth from the open end where the conduit's end happens to come, and with the knockout provided in that wall at such a point, or so close thereto that bending is unnecessary.

As a result of the present invention, extension boxes are not needed for the purpose of facilitating connection, and the simplicity of installation of the outlet boxes and the connection of the conduits thereto greatly lessens the cost of installation and improves the quality thereof.

I claim as my invention:

1. An electrical outlet box open at one end, and having enclosing side walls, one such wall at least being fractured about the margins of a plurality of substantially circular areas, to constitute abeyant knockouts, at least one of said areas overlapping another such area in a lenticular area which is common to each knockout.

2. An electrical outlet box as in claim 1, wherein the centers of the circular areas are arranged along a common longitudinally directed axis.

3. An electrical outlet box as in claim 1, including at least three circular areas and two separate and non-coincident lenticular areas, arranged along a common, longitudinally directed axis.

4. An electrical outlet box as in claim 1, wherein the fractured side wall, the circular areas, and the lenticular area or areas are disposed each in its individual plane, non-coincident with the plane of its comarginal areas.

5. An electrical outlet box as in claim 4, wherein each circular area, outside its lenticular area, is secured to the comarginal wall area by a frangible but nonfractured tongue.

6. An electrical outlet box as defined in claim 5, characterized in that the entire margins of the lenticular area or areas are substantially completely fractured, but are retained in place by their marginal resistance to displacement relative to those portions of the circular areas which are comarginal with the wall.

7. An electrical outlet box as defined in claim 5, characterized in that the marginally fractured lenticular areas are secured directly to a different portion of one such circular area within the wall by a frangible tongue.

8. An electrical outlet box having side walls and an end wall, and an open end, at least one wall being fractured substantially in a pattern of at least three successively overlapping circles, arranged in a pattern such that two of the circles are mutually tangent, and a third circle encloses and is centered at the point of tangency.

9. An electrical outlet box as in claim 8, wherein at least one additional wall, adjacent the fractured wall first mentioned, is similarly fractured in a like pattern of at least three successively overlapping circles, but with the centers of the terminal circles displaced longitudinally of the box with relation to the location of the centers of the terminal circles in the first-mentioned side wall.

OSCAR J. OLSON.

References Cited in the file of this patent

UNITED STATES PATENTS

| Number | Name | Date |
|---|---|---|
| 784,555 | Fountain | Mar. 14, 1905 |
| 977,643 | Le Manquais | Dec. 6, 1910 |
| 1,215,249 | Burns | Feb. 6, 1917 |
| 1,608,621 | Sachs | Nov. 30, 1926 |
| 1,813,331 | Wadworth | July 7, 1931 |
| 1,950,523 | Severn | Mar. 13, 1934 |
| 2,240,187 | Kingdom et al. | Apr. 29, 1941 |
| 2,291,107 | Rybolt | July 28, 1942 |
| 2,297,862 | Bachmann | Oct. 6, 1942 |